United States Patent [19]
Miyazaki

[11] Patent Number: 6,054,678
[45] Date of Patent: Apr. 25, 2000

[54] HEATER-SENSOR COMPLEX

[75] Inventor: Mitsuhiko Miyazaki, Osaka, Japan

[73] Assignee: Hakko Corporation, Osaka, Japan

[21] Appl. No.: 09/041,524

[22] Filed: Mar. 12, 1998

[51] Int. Cl.[7] .................... H05B 1/00; B23K 3/03
[52] U.S. Cl. .................. 219/237; 219/473; 219/229; 219/241; 338/302; 338/270; 374/182
[58] Field of Search .................. 219/229, 236, 219/241, 237, 233, 209, 473, 544; 338/302, 270; 374/179, 181, 182

[56] References Cited

U.S. PATENT DOCUMENTS

| | | | |
|---|---|---|---|
| 2,717,952 | 9/1955 | Dvorak | 219/229 |
| 2,747,074 | 5/1956 | Finch | 219/229 |
| 2,897,335 | 7/1959 | Finch | 219/229 |
| 5,043,560 | 8/1991 | Masreliez | 219/497 |
| 5,122,637 | 6/1992 | Bottorff et al. | 219/229 |
| 5,406,053 | 4/1995 | Masreliez | 219/229 |

*Primary Examiner*—John A. Jeffery
*Attorney, Agent, or Firm*—Vedder Price Kaufman & Kammholz

[57] ABSTRACT

A heater/sensor with an electric heating coil has an insulating pipe with a bore therein has nonheating wire threaded therethrough. The nonheating wire is attached to a first end of a heating wire which is wound about the periphery of the insulating pipe. A second end of the heating wire is attached to a second nonheating wire. A first ceramic coating of a binder and a coarse grade alumina is formed on the pipe and wires through a dip process. A second ceramic coating of a binder and a fine alumina coating is formed on the first ceramic coating though a second dip process. The twice coated heater/sensor complex is secured in a soldering iron tip.

5 Claims, 9 Drawing Sheets

HEATER-SENSOR COMPLEX

BACKGROUND OF THE INVENTION

1. Field of the Invention

The present invention relates to a two-lead type heat-sensor complex comprising a heater unit and a sensor unit as integrated. More particularly, the invention relates to a heater-sensor complex suitable for use as a heat input for a soldering iron.

2. Description of the Related Art

Referring to FIG. 11 which illustrates the tip of a soldering iron, a rod-shaped ceramic heater 51 is shown as fitted in the tip portion 52 of a soldering iron. This ceramic heater 51 includes a ceramic green sheet 53 wrapped round a ceramic mandrel. The ceramic green sheet 53 has been printed with a heater pattern and a sensor pattern. The topological relationship of the patterns may for example be as illustrated in FIG. 12. In this example, the sensor pattern 55 is a pattern printed using a tungsten paste in a breadth of 0.2 mm and a heater pattern 54 is a pattern printed using the tungsten paste in a breadth of 0.4 mm surrounding said sensor pattern 55. The sensor pattern 55 extends rearward across the heater pattern 54 and is connected to sensor electrodes 56, while the heater pattern 54 is connected to heater electrodes 57 which are situated forwardly of said sensor electrode 56.

However, the sensor-mounted ceramic heater illustrated in FIGS. 11 and 12 has the disadvantage that because it has four leads, the outer diameter of said ceramic mandrel cannot be reduced to less than 3.5 mm. Thus, if a size reduction is required of a soldering iron, the pipe diameter cannot be decreased any further because of the limited freedom in management of the leads. There also is the disadvantage that because the sensor is located on the peripheral surface of the ceramic mandrel, the tip temperature of the soldering iron cannot be detected with precision. Furthermore, in the case of soldering irons such that the detection of the tip temperature hinges on the temperature-dependent change in resistance value, the illustrated soldering iron being no exception, there must be a fair variation among products so that each product has to be adjusted to fall within tolerance limits.

Meanwhile, there is also available a heater-sensor fabricated in such a manner that instead of wrapping a green sheet round a ceramic mandrel, an electrothermic wire is directly wound round a ceramic mandrel and the winding is then coated with a ceramic coating to insure the necessary insulation.

However, such a heater has the disadvantage that when the ceramic coat consists of closely packed fine ceramic particles, the coat tends to develop cracks because of the relatively high coefficient of thermal expansion of the electrothermic wire as compared with the coefficient of thermal expansion of the ceramic coat. On the other hand, if coarse ceramic particles are used for said ceramic coating, the insulation resistance drops to cause a leak of current to the work load, e.g. a substrate.

Designed to overcome the above-mentioned disadvantages of the prior art, the present invention has for its object to provide a heater-sensor complex which, despite its simple construction, is not only capable of detecting the tip temperature of a soldering iron with precision but also insures a thorough insulation without the risk for incidence of cracks in the insulation layer.

SUMMARY OF THE INVENTION

Developed to accomplish the above object, the present invention relates to a heater-sensor complex comprising a heating member made of a first metallic material, a non-heating member made of said first metallic material, and a non-heating member made of a second metallic material, with said heating member made of said first metallic material being welded to a forward end of said non-heating member made of said second metallic material, said first metallic material being an electrothermic iron-chromium alloy, and said second metallic material being a nickel or nickel-chromium alloy, thus forming a thermocouple therebetween.

Preferably, said heating member made of said first metallic material is a relatively small gauge wire which is wound in the form of a coil round a cylindrical insulating pipe and connected to said non-heating member made of said first metallic material which is a linear relatively large gauge wire rigidly secured to the peripheral surface of said insulating pipe, and said non-heating member made of said second metallic material being a linear member passing into the bore of said insulating pipe.

Since, in accordance with the invention, an iron-chromium alloy electrothermic material is used in combination with a nickel or nickel-chromium alloy to form a thermocouple, the tip temperature of the soldering iron can be detected with precision and in a simple manner.

BRIEF DESCRIPTION OF THE SEVERAL VIEW OF THE DRAWING

Figure 1:
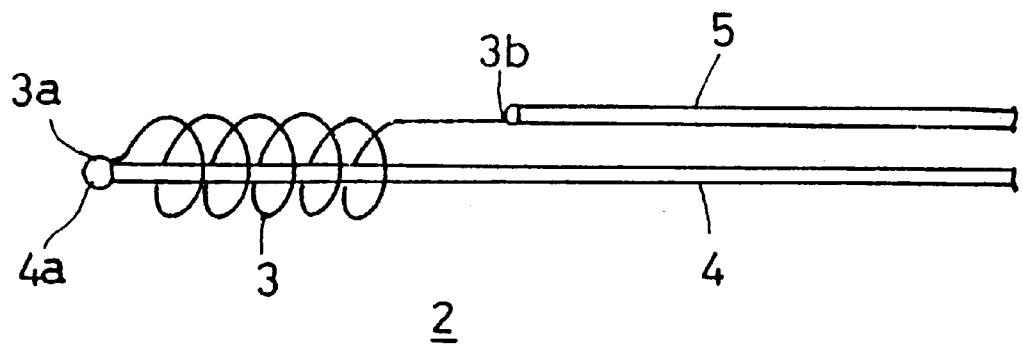
FIG. 1 is a schematic view showing the fundamental construction of a heater-sensor complex embodying the principle of the invention.
Figure 3A:
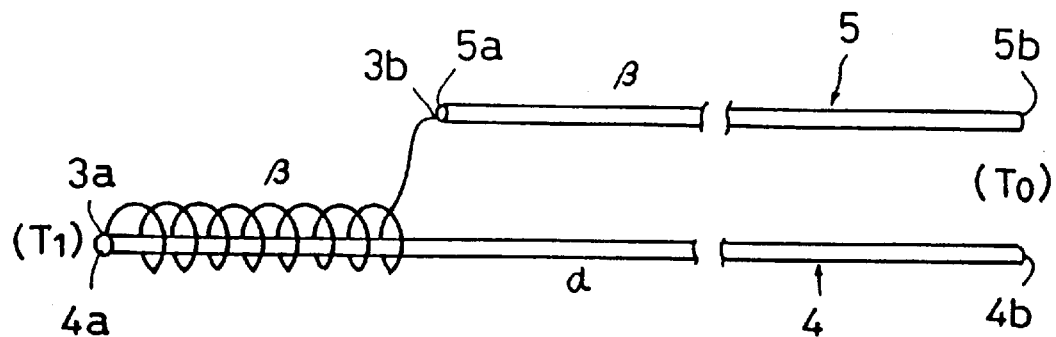
Figure 3B:
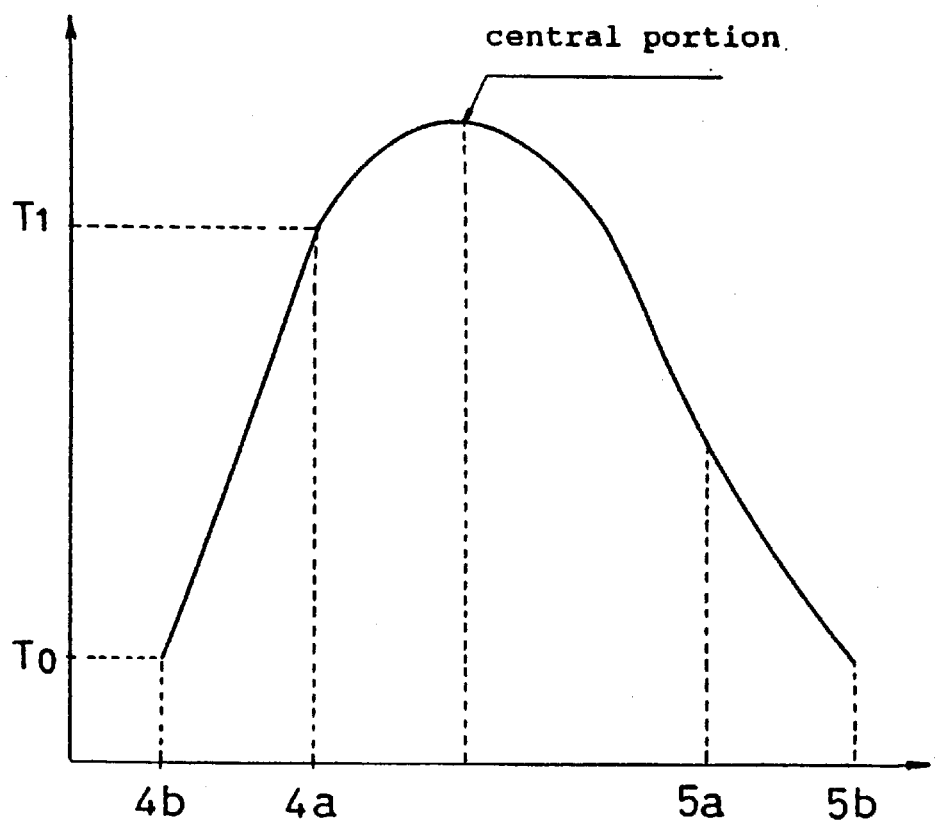

FIG. 3(a) and 3(b) are a diagrams showing the temperature profile of the heater-sensor complex illustrated in FIG. 1.

Figure 4:
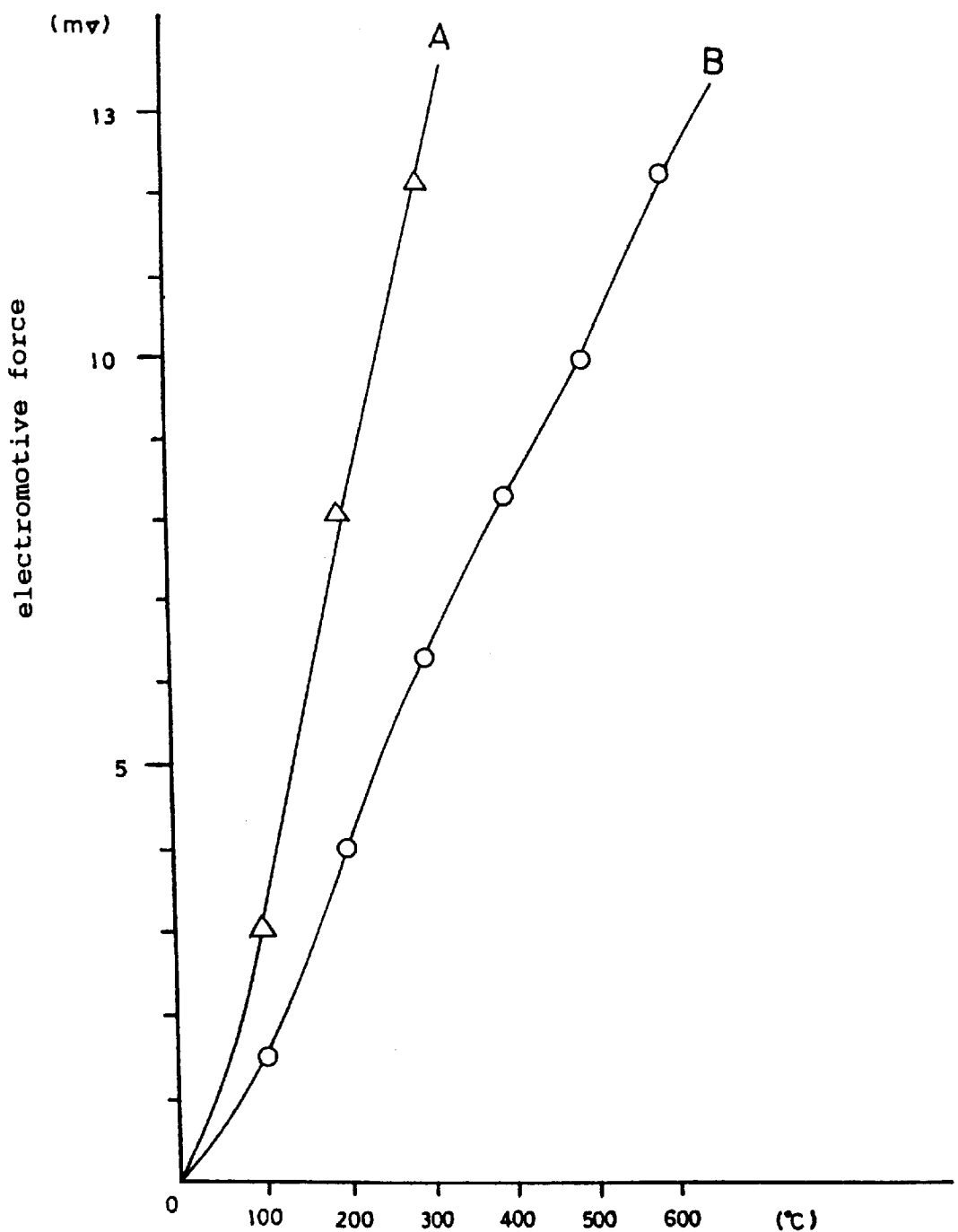

FIG. 4 is a diagram showing the thermoelectromotive force characteristic of the heater-sensor complex illustrated in FIG. 1.

Figure 2:
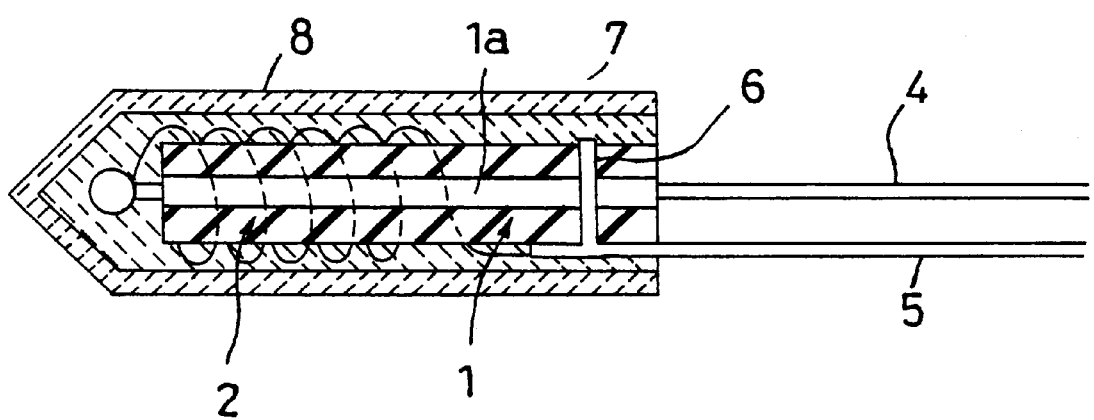
FIG. 2 is a view showing the heater-sensor complex illustrated in FIG. 1 as installed in an insulating pipe to form an insulation layer.
Figure 5:
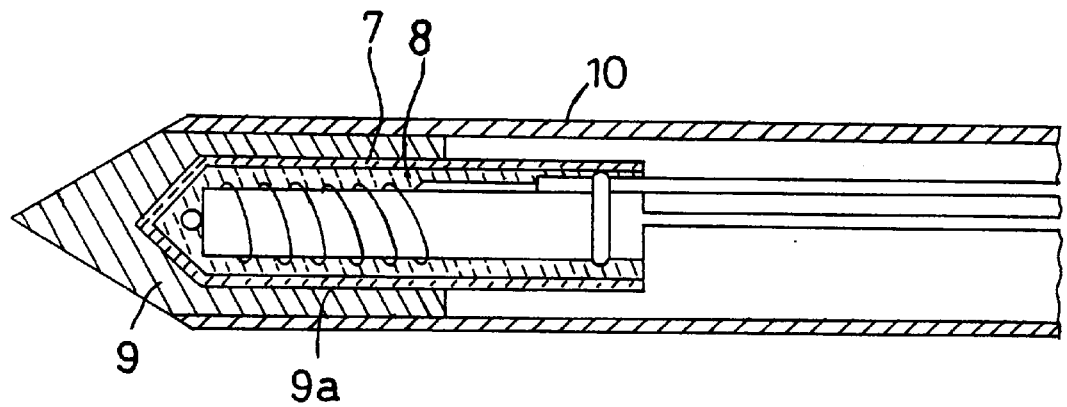

FIG. 5 is a view showing the geometric relationship of the heat-sensor complex illustrated in FIG. 2 to a protective pipe.

Figure 6:
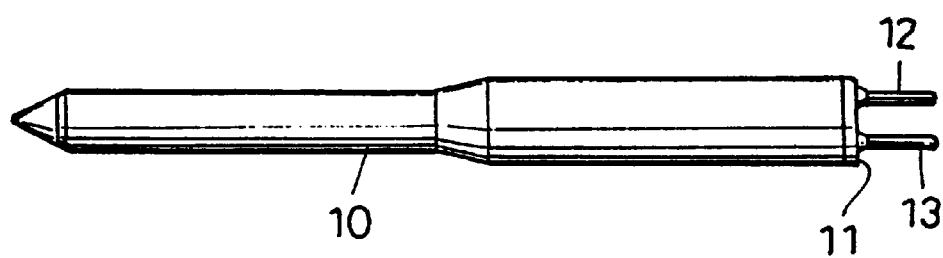

FIG. 6 is a view showing the overall shape of the soldering iron heater.

Figure 7:
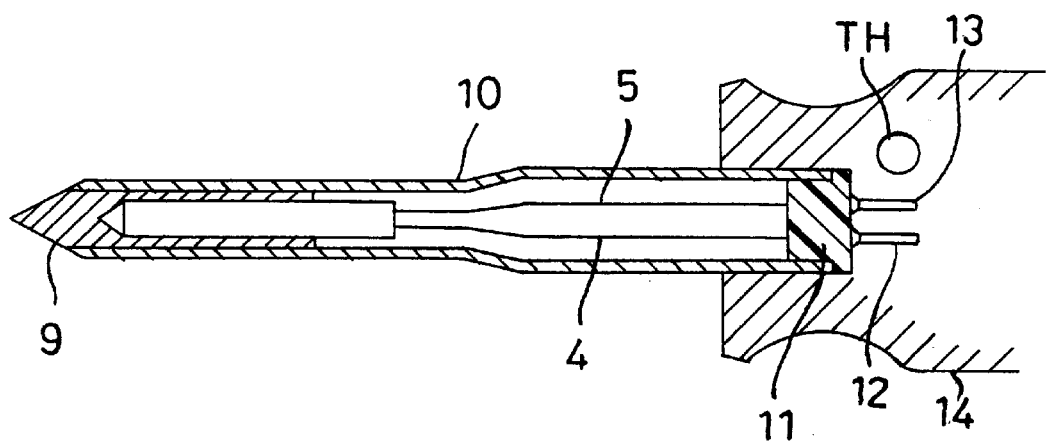

FIG. 7 is a sectional view showing the construction of the soldering iron.

Figure 8:
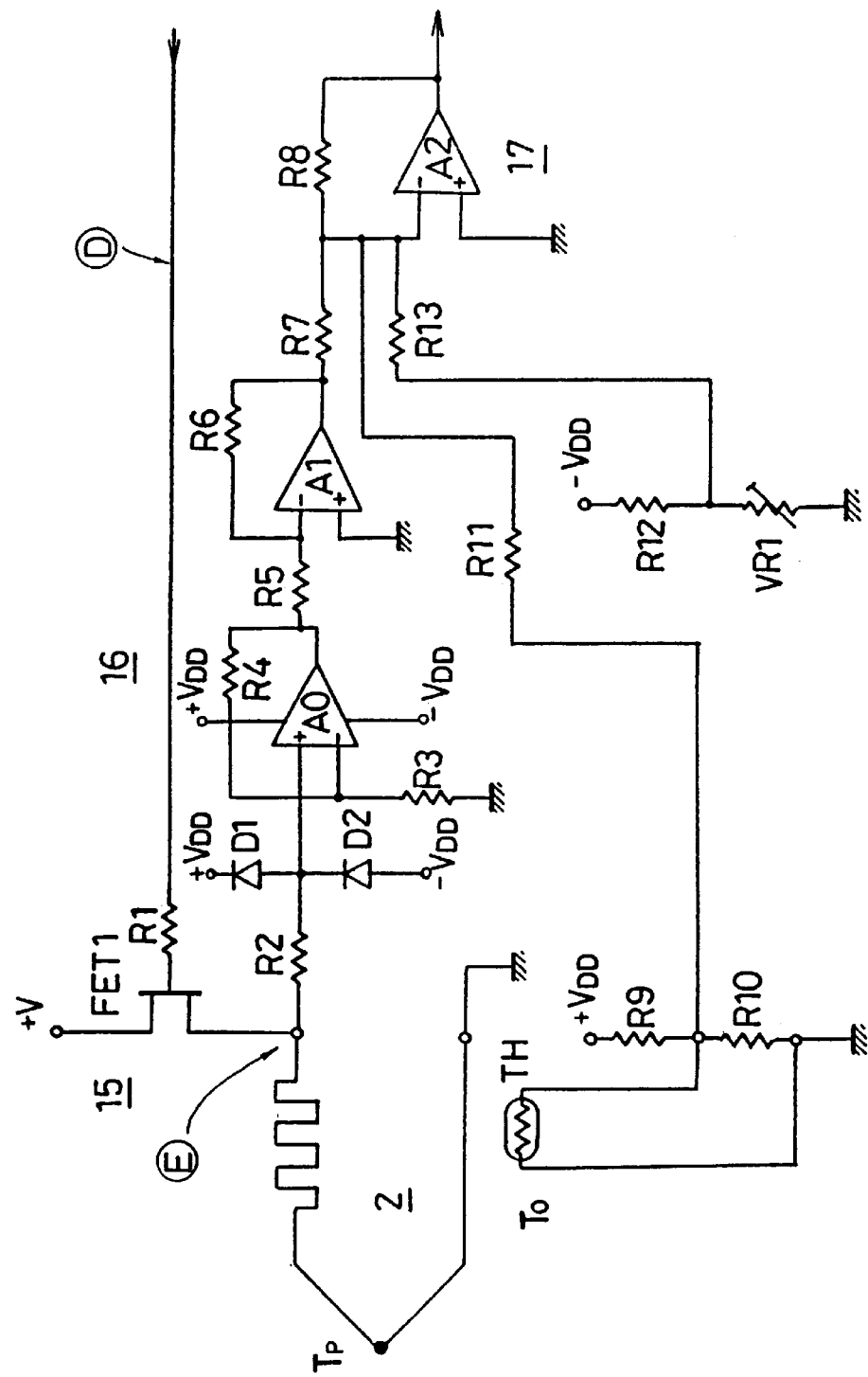

FIG. 8 is a diagram showing a part of the temperature control circuit of the soldering iron.

Figure 9:
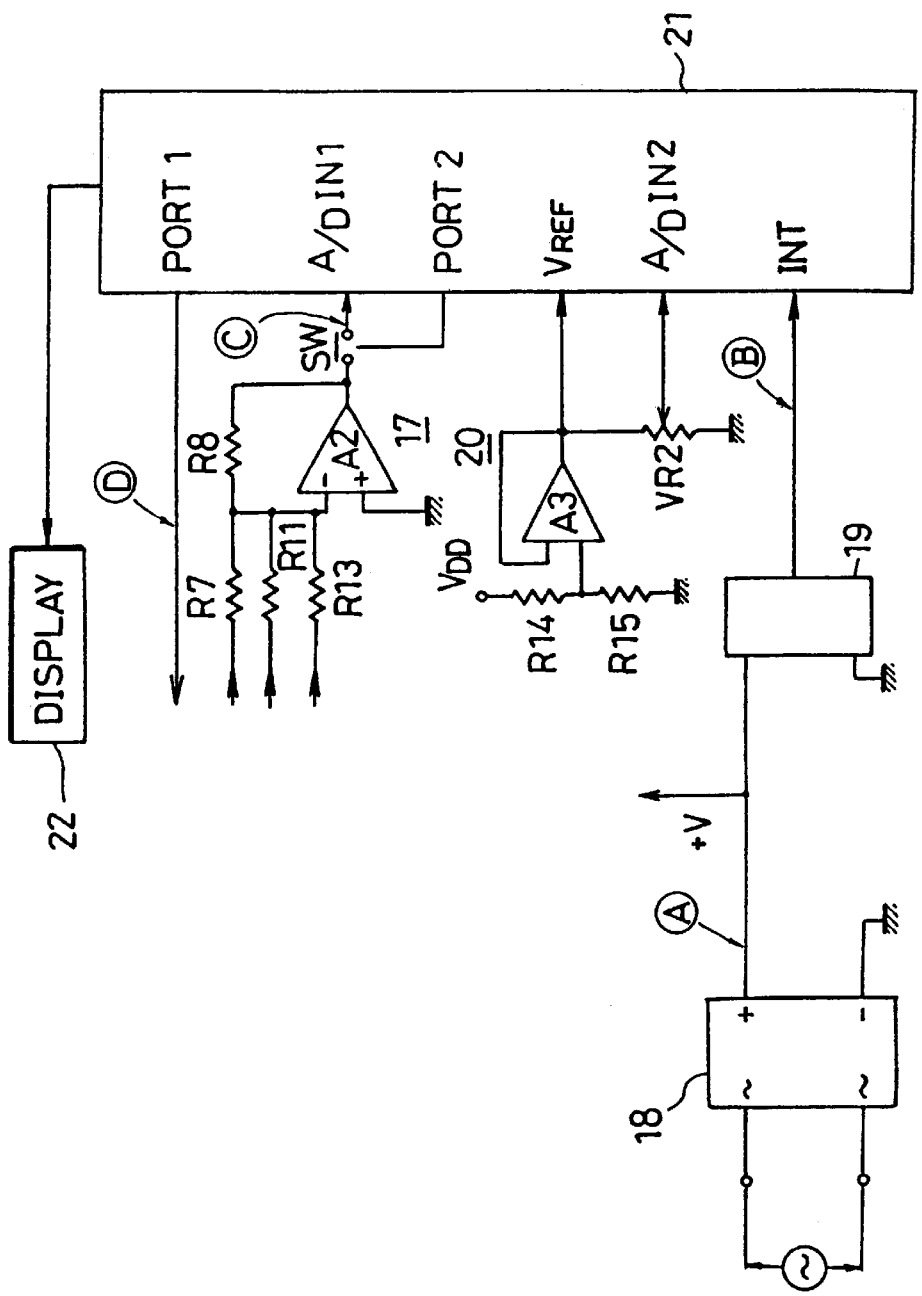

FIG. 9 is a diagram showing the remaining part of the same temperature control circuit.

Figure 10:
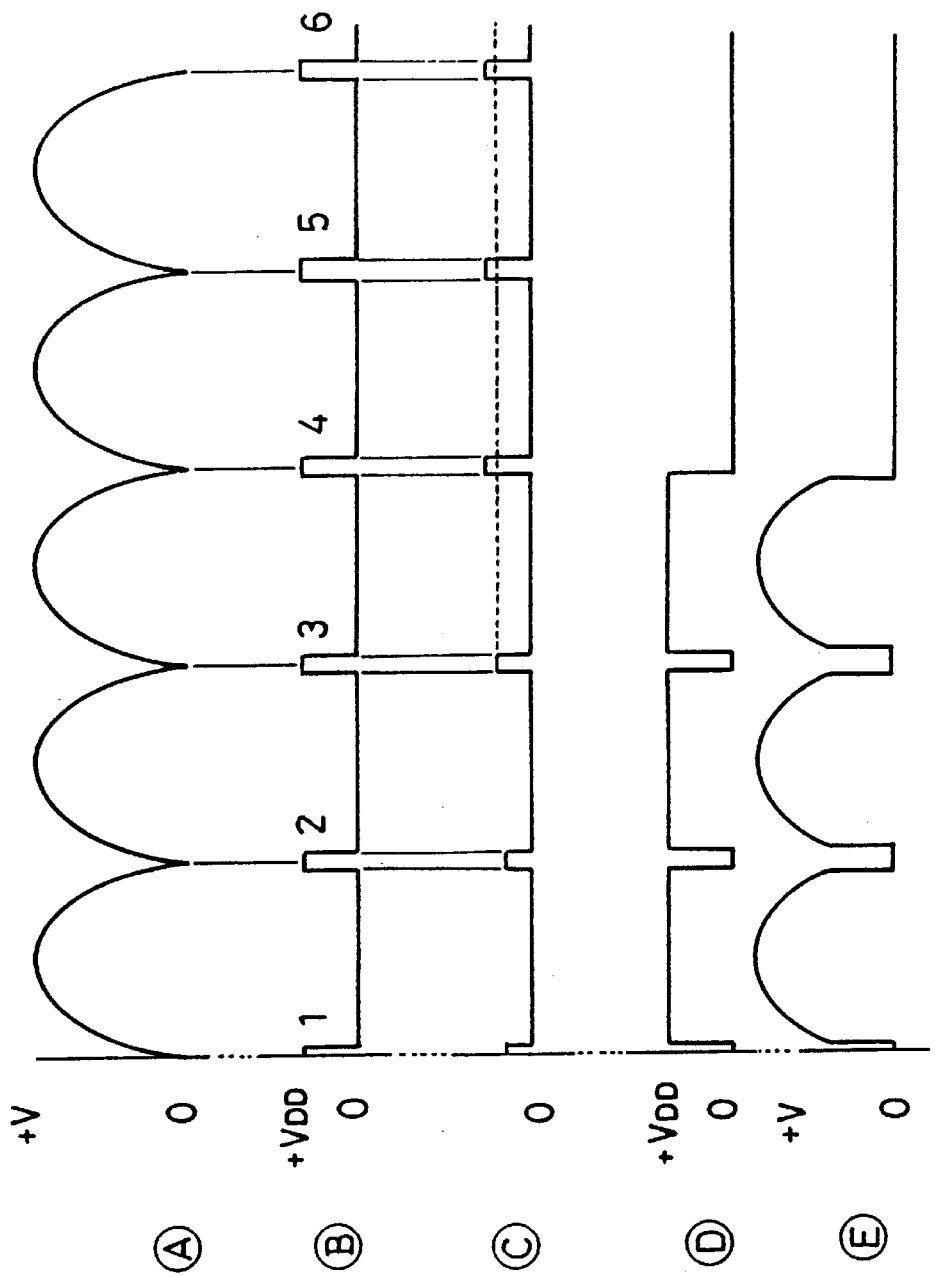

FIG. 10 is a timing chart showing the waveforms in the respective blocks of the control circuit illustrated in FIG. 8.

Figure 11:
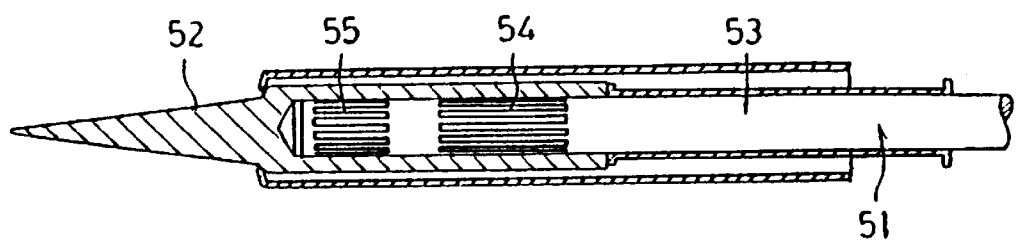

FIG. 11 is a view showing the construction of the conventional soldering iron heater.

Figure 12:
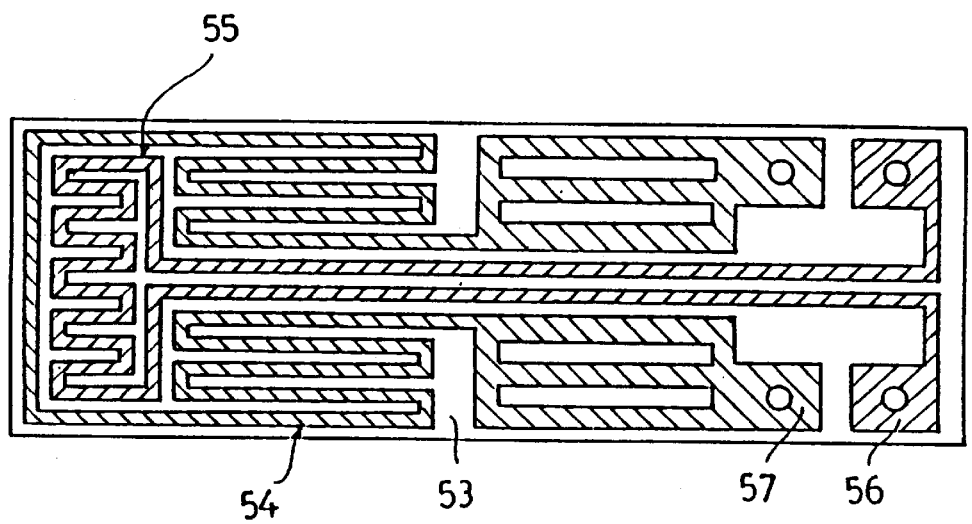

FIG. 12 is a view showing the heater pattern and the sensor pattern.

DETAILED DESCRIPTION OF THE PREFERRED EMBODIMENTS

The present invention is now described in further detail with reference to the preferred embodiments shown in the several views of the accompanying drawing.

As illustrated in FIGS. 1 and 2, the principal part of the soldering iron heater according to the present invention comprises a cylindrical insulating pipe 1 having an axial bore 1a and a heater-sensor complex 2 mounted thereon. The insulating pipe 1 may for example be an alumina pipe.

Referring to FIG. 1 which illustrates the heater-sensor complex 2, a tip 3a of a coil-shaped heating wire 3 is welded to a tip 4a of a linear non-heating wire 4 by argon welding. The base end 3b of the heating wire 3 is welded to a linear non-heating wire 5. The heating wire 3 is made of iron-chrominum alloy. Typical examples of the alloy composition are shown in Table 1.

TABLE 1

|  | Cr | Al | Mn | C | Fe |
|---|---|---|---|---|---|
| Class 1 | 23–27 | 3.5–5.5 | ≦1.0 | ≦0.15 | Balance |
| Class 2 | 17–21 | 2–4 | ≦1.0 | ≦0.15 | Balance |

Among such iron-chromium alloys, kanthal D (a kanthal wire manufactured by Kanthal Co.) is preferred. The proportions of its principal constituent elements are Cr=22.0 and Al=4.8. Such alternative compositions as Cr=22.0, Al=5.8, Cr=22.0, Al=5.3, and Cr=20.0, Al=4.0 can also be employed.

In this embodiment, the non-heating wire 4 is made of nickel but the non-heating wire 5 and the heating wire 3 are made of the same Kanthal D alloy. However, to prevent generation of heat in the non-heating wire 5, the diameter of the non-heating wire 5 is about 2.5 times as large as the diameter of the heating wire 3.

When a heater-sensor complex 2 of the above construction is supplied with an electric current, the heating wire 3 generates heat so that theoretically the temperature profile shown in FIG. 3 (*b*) is obtained. Thus, whereas the temperatures of the base ends 4b, 5b of the non-heating wires 4, 5 are substantially identical and equal to $T_0$, the argon-welded spots 4a, 3a assume a temperature of $T_1$ and the heating wire 3 shows a high temperature in its central portion. The kanthal wires (3, 5) and the Ni wire (4) constitute a thermo-couple, with the result that, assuming that the Seebeck coefficient of the Ni wire is $\alpha$ and the Seebeck coefficient of the Kanthal wires is $\beta$, an electromotive force of the order of $$\alpha(T_1-T_0)-\beta(T_1-T_0)$$

is generated between the base end 4b of the non-heating wire 4 and the base end 56 of the non-heating wire 5 (Kanthal wire).

Since $\alpha$ and $\beta$ are of different signs, the electromotive forces of the non-heating wires 4, 5 are added to each other. The temperature of the tip portion 5a of the non-heating wire 5 rises in accordance with the temperature gain of the heating wire 3 and, therefore, assuming that a Ni wire is chosen for the non-heating wire 5, the electromotive force between the base ends 4b, 5b of the non-heating wires 4, 5 is decreased.

TABLE 2

| Temperature | (Unit: mV) | | | | |
|---|---|---|---|---|---|
|  | 0 | 100 | 200 | 300 | 400 |
| 0 | 0 | 1.731 | 3.622 | 6.332 | 8.410 |
| 10 | 0.175 | 1.939 | 3.830 | 6.521 | 8.626 |
| 20 | 0.381 | 2.079 | 4.044 | 6.724 | 8.849 |
| 30 | 0.587 | 2.265 | 4.400 | 6.929 | 9.060 |

TABLE 2-continued

| Temperature | (Unit: mV) | | | | |
|---|---|---|---|---|---|
|  | 0 | 100 | 200 | 300 | 400 |
| 40 | 0.804 | 2.470 | 4.691 | 7.132 | 9.271 |
| 50 | 1.005 | 2.676 | 4.989 | 7.356 | 9.531 |
| 60 | 1.007 | 2.899 | 5.289 | 7.561 | 9.748 |
| 70 | 1.107 | 3.081 | 5.583 | 7.774 | 10.210 |
| 80 | 1.310 | 3.186 | 5.879 | 7.992 | 10.219 |
| 90 | 1.522 | 3.422 | 6.075 | 8.200 | 10.429 |
| 100 | 1.731 | 3.622 | 6.332 | 8.410 | 10.649 |

Table 2 shows the measured characteristics of the heater-sensor complex 2. Thus, the temperature of the argon-welded spots 3a, 4a was increased from 0° C. to 500° C. and the voltage values at the ends of non-heating wires 4b, 5b were measured. It will be seen from Table 2 that a good linearity can be obtained over the temperature range of 200° C.–450° C. which is generally used for soldering irons and that the sensor output is of the practically useful level. FIG. 4 is a diagram comparing the output characteristic of the heater-sensor complex 2 (B) with the characteristic of a thermocouple K (A), indicating that the electromotive force of the heater-sensor complex 2 is about one-half of the electromotive force of the thermocouple K. With this heater-sensor complex 2, a stable sensor output can be obtained up to 600° C. as can be seen from the diagram, indicating that this heater-sensor complex 2 can be used not only as a temperature sensor for soldering irons but also in other applications.

The method of manufacturing the soldering iron heater according to the present invention is now described. First, the non-heating wire 4 is passed into the bore 1a of the insulating pipe 1 and the heating wire 3 is wound round the periphery of the insulating pipe 1. Then, using a fixing wire 6 comprising a kanthal wire, the non-heating wire 5 is secured to the periphery of the insulating pipe 1 (FIG. 2).

Thereafter, a first ceramic coating 7 is applied by the dip coating technique over the argon-welded spots 3a, 4a, heating wire rod 3, and fixing wire 6 and the applied coating 7 is dried and fired. The first ceramic coating 7 mentioned above is an aqueous dispersion containing a binder and a coarse grade alumina powder and, when the applied coat is dried and fired, the argon-welded spots 3a, 4a and heating wire rod 3 are rigidly secured to the insulating pipe 1. Since this ceramic coating 7 is a dispersion of coarse particles, it effectively absorbs the difference in the coefficient of thermal expansion between the insulating pipe 1 and the heating wire 3 so that no cracking or cleavage occurs in use.

Then, a second ceramic coating 8 is applied by the dip coating technique, dried, and fired. At the same time, using this ceramic coating 8, the heater-sensor complex 2 is secured in the recess 9a formed in the tip portion 9 of the soldering iron (FIG. 5). Of course, the tip 9 of the soldering iron is made of a material having good thermal conductivity.

The second ceramic coating 8 is specifically an aqueous dispersion containing a binder and a fine alumina powder and when this coating is dried and fired, a positive insulation is obtained. Moreover, through this second ceramic coating 8, the heater-sensor complex 2 is rigidly secured to the tip portion 9 of the soldering iron.

Since, in the heater-sensor complex 2 of the present invention, the non-heating wire 4 is retained with a free air space around it in the bore 1a of the insulating pipe 1, the non-heating wire 4 is substantially not susceptible to the temperature of the heating wire 3. Moreover, as the nonheating wire 4 is a Ni wire resistant to oxidative corrosion, it can be disposed in contact with air.

After the heater-sensor complex 2 is securely installed in the recess 9a of the tip portion 9 of the soldering iron, the protective pipe 10 is secured to the periphery of the tip portion 9 at the base end side thereof (FIG. 5). Furthermore, a synthetic resin member (lead portion) 11 is fitted to the base of the protective pipe 10 with the connecting terminals 12, 13 extending out of the synthetic resin member, with the result that, as a whole, an integrated soldering iron heater is provided (FIG. 6). This soldering iron heater is mounted or dismounted by connecting or disconnecting said terminals 12, 13 with respect to the corresponding connectors. As illustrated in FIG. 7, the base side of the protective pipe 10 is firmly held by a grip member 14 and a thermister TH for temperature measurement is disposed in close proximity with the connecting terminals 12, 13.

FIGS. 8 and 9 show the temperature control circuit including the heater-sensor complex 2. The illustrated temperature circuit essentially comprises said heater-sensor complex 2 for heating the tip and detecting the tip temperature $T_1$ of the soldering iron, said thermister TH for detecting the base end temperature To of the heater-sensor complex 2, a power supply block 15 for the heater-sensor complex 2, an amplifying block 16 for amplifying the thermocouple output from the heater-sensor complex 2, an adder block 17 for adding up the thermocouple output and thermister output, a full-wave rectifier 18 for rectifying an AC voltage (FIG. 9, the same applies to the following elements), a zero crossing pulse generator 19, a temperature setting block 20 for setting the tip temperature of the solder iron, and a microcomputer unit 21 for controlling the whole operation. The calculated tip temperature is indicated on a display 22 connected to the microcomputer unit 21.

In this embodiment, the microcomputer unit 21 is specifically a one-chip microcomputer M37470 (Mitsubishi). This microcomputer unit 21 is provided with output ports, PORT1 and PORT2, and it is so arranged that the power supply block 15 is controlled ON/OFF according to the output data at PORT1 and the switch SW at the output of the adder 17 is controlled ON/OFF according to the output data at PORT2.

Furthermore, the microcomputer unit 21 is provided with analog input terminals ADIN1 and ADIN2, which are connected to an A/D converter. The output value from the adder block 17 is fed to the analog input terminal ADIN1 and the voltage value corresponding to the set temperature is fed to the analog input terminal ADIN2. The analog input terminal VREF of the microcomputer unit has been supplied with a reference voltage (e.g. 2.55 V) for the A/D converter, whereby the resolution of the A/D converter is determined.

The microcomputer unit 21 is further provided with an interrupt terminal INT which is connected to the zero crossing pulse generator 19 so that when the full-wave-rectified pulse current value has reached 0 volt, an interrupt signal is applied to the microcomputer unit 21, whereupon the program of an interrupt routine is started.

As shown in FIG. 8, the power supply block 15 comprises a field-effect transistor FET1 and a resistor R1 connected to the gate terminal of the transistor FET1. The drain terminal of the transistor FET1 is connected to the output of the full-wave rectifier 18+ V (e.g. waveheight value=2.4 volts), while the source terminal is connected to the heat-sensor complex 2.

The amplifier 16 comprises a current limiting resistor R2, diodes D1, D2, a noninverting amplifier A0, resistors R3, R4, which implement an amplification factor of about 250, an inverting amplifier A1, and resistors R5, R6. According to this circuitry, the sensor voltage from the heater-sensor 2 is amplified about 250-fold and its phase inverted by said non-inverting amplifier A0 and inverting amplifier A1. Resistance values may for example be R3=1 KΩ, R4=250 KΩ, and R5=R6=100 KΩ.

Since, in this circuit, the source voltages of the noninverting amplifier A0 are $+V_{DD}$ and $-V_{DD}$ (e.g. ±5 volts), application of any voltage beyond the range of $+V_{DD}$~$-V_{DD}$ to the noninverting amplifier A0 would cause deterioration of characteristics or even breakdown. Therefore, clamp diodes D1, D2 are provided so that only voltages within the range of $+V_{DD}+VF$~$-V_{DD}$~$-V_{DD}$ will be applied to the noninverting amplifier A0. It should be noted that VF is the forward voltage of the diodes D1, D2.

Now, when the transistor FET1 is ON, the voltage $V-V_{DD}-VF$ is applied to the resistor R2 but since the resistance value of resistor R2 is set to about 10 kΩ, only a current of about 2 mA at most flows. On the contrary, when the transistor FET1 is OFF, the thermo-couple output from the heater-sensor complex 2 is applied to resistor R2 so that there may be cases in which a voltage drop in resistor R2 presents a problem. However, since the amplification is performed by the noninverting amplifier A0 in this invention, its input impedance $R_{in}$ is sufficiently large to satisfy the condition of $R_{in}$>>R2, with the result that the exact thermocouple output can be detected. If an inverting amplifier be adopted for this amplification, the condition of $R_{in}$>>R2 might not be satisfied.

The adder block 17 essentially comprises an inverting amplifier A2 and resistors R7, RB, R11, and R13. To the thermister TH, a resistor R10 is connected in parallel, and the source voltage $+V_{DD}$ is fed through a resistor R9. Resistance values may for example be R7=R8=100 KΩ, R11=R13=47 KΩ, R9=220 KΩ, and R10=50 KΩ. Disposed between the adder block 17 and the microcomputer unit 21 is an open-close switch SW which is controlled from the output port PORT2 (FIG. 9).

In the adder block 17, the input from the inverting amplifier A1 is applied to the inverting amplifier A2 through resistor R7 and the input from thermister TH is fed to the amplifier A2 through resistor R11. Moreover, the voltage made available by dividing the source voltage $-V_{DD}$ by resistor R12 and variable resistor VR1 is fed to the inverting amplifier A2 through resistor R13.

Since the output of the inverting amplifier A2 is added to the A/D converter of the microcomputer unit 21, the output of the inverting amplifier A2 must be constantly maintained in the plus range regardless of the temperature-dependent change of the output voltages from the heat-sensor complex 2 and thermister TH. Therefore, in the present invention, the variable resistor VR1 is adjusted so that the output of the inverting amplifier A2 will always be within the range of 0 V–2.55 V.

As shown in FIG. 9, the temperature setting block 20 comprises resistors R14, R15, a buffer A3, and a variable resistor VR2. While a reference voltage $V_{REF}$ is applied to the variable resistor VR2, it is so arranged that by manipulating the variable resistor VR2 a voltage corresponding to the set temperature of 200° C.–450° C. can be applied to the analog input terminal AIN2 of the microcomputer unit.

The operation of the control circuit shown in FIGS. 8 and 9 is now described with reference to the timing chart of FIG. 10. FIG. 10 shows the output of full-wave rectifying circuit (A), the output of Zero crossing pulse generator (B), the input to analog input terminal ADIN1 (C), output from output port PORT1 (D), and the terminal end voltages of heat-sensor complex 2 (E).

When the output value of the full-wave rectifying circuit 18 becomes 0 volt and the output of the zero crossing pulse generator 19 is increased, the microcomputer 21 is interrupted by a pulse signal applied to the interrupt terminal INT. In the interrupt routine, the microcomputer unit 21 first outputs a control signal to the output ports PORT1, PORT2 to bring the transistor FET1 into OFF condition and set the open-close switch SW1 to ON position.

When the transistor FET1 is set in OFF condition, the current supply to the heater-sensor 2 is stopped so that only the thermocouple output appears at the two ends of the heater-sensor complex 2. This thermocouple output is a value corresponding to the temperature difference $T_1-T_0$ between the tip temperature $T_1$ and the base (4b, 5b) temperature $T_0$, and this thermocouple output is amplified about 250-fold in the amplifying block 16 and applied to the resistor R5 of the adder block 17. On the other hand, a voltage corresponding to the resistance value of thermister TH1 is applied to the resistor R7 in the adder block 17 and the resistance value of thermister TH1 changes in response to the temperature $T_0$ of the base portions 4b, 5b of the sensor-heater complex 2. Therefore, the adder block 17 outputs a voltage corresponding to the soldering iron tip temperature $T_1$. Since the open-close switch SW 1 is in the ON state at this moment, this voltage corresponding to the tip temperature $T_1$ is fed to the microcomputer unit 21 from said analog input terminal ADIN1.

Meanwhile, a voltage corresponding to the set temperature $T_S$ has been fed from the analog input terminal ADIN2. Therefore, the microcomputer unit 21 compares the voltage from the analog input terminal ADIN1 with that from the analog input terminal ADIN2 to figure out whether the current tip temperature $T_p$ is higher than the set temperature value $T_S$ or not.

Now, when the interrupt pulse (FIG. 10 (B)) is not later than the initial 3rd one, it means that the tip temperature $T_p$ is lower than the set temperature value $T_S$. Under this condition $T_p<T_S$, the microcomputer unit 21 sets the open-close switch SW1 OFF through output port PORT2 and sets the transistor FET1 ON through output port PORT1 to end the interrupt routine. Then, because the transistor FET1 has been set ON, the output of the full-wave rectifying block 18 is fed as it is to the sensor-heater 2 so that the heater is energized to increase the soldering iron tip temperature.

Referring to the timing chart of FIG. 10, when the interrupt pulse is not later than the first 3rd one, the same operation as above is repeated so that the tip temperature $T_p$ rises. In response to this rise in tip temperature, the input to the analog input terminal ADIN1 is increased.

However, when the interrupt pulse is the 4th or subsequent one, it means that the soldiering iron tip temperature $T_p$ is higher than the set temperature $T_S$ ($T_p>T_S$) so that the microcomputer unit 21 brings the open-close switch SW1 and transistor FET1 into the OFF state through output ports PORT1, PORT2 to end the interrupt routine. As the transistor FET1 is thus set OFF, the power supply block 15 continues suspending the current supply to the sensor-heater complex 2 even after completion of the interrupt routine so that the soldering iron tip temperature drops continuously. Then, as the tip temperature $T_p$ falls below the set value $T_S$ ($T_p<T_S$), the power supply block 15 resumes the current supply to the heater-sensor 2.

What is claimed is:

1. A heater-sensor complex adapted for use in an integrated replaceable soldering iron heater comprising a soldering tip portion with a recess, a hollow protective pipe fixed on the outer periphery of the base end side of the soldering tip portion and a lead portion with two connecting terminals at the base of the protective pipe, and secured in the recess through first and second ceramic coatings wherein, a heating member and a first non-heating member are made of a first metallic material, a second non-heating member is made of a second metallic materials and the heating member and the forward end of the second non-heating member are connected to form a thermocouple;

said heating member comprising a small gauge wire wound in the form of a coil around a cylindrical insulating pipe is connected to said first non-heating member comprising a large gauge linear wire secured to the outer periphery of said insulating pipe;

said second non-heating member is a generally linear member passed into the bore of said insulating pipe and so that free air space surrounds said second member;

a first ceramic coating is provided around said insulating pipe to cover said heating member, the first coating material being coarse grade powder to absorb a difference in thermal expansion coefficient between said insulating pipe and said heating member of said first metallic material;

a second ceramic coating is provided on said first ceramic coating, the second coating material being fine grade powder to achieve strict insulation.

2. A heater-sensor complex according to claim 1, wherein said first metallic material is an electrothermic iron-chromium alloy, and main materials other than iron are chromium and aluminum.

3. A heater-sensor complex according to claim 1, wherein said second metallic material is nickel.

4. A heater-sensor complex according to claim 1, wherein diameter of said first non-heating member is approximately 2.5 times as large as that of said heating member.

5. An integrated replaceable soldering iron heater consisting of soldering tip portion with a recess, a hollow protective pipe secured to the outer periphery of the base end side of the soldering tip portion, a lead portion with two connecting terminals at the base of the protective pipe and a heater-sensor complex secured in the recess through first and second ceramic coatings wherein, a heating member and a first non-heating member are made of a first metallic material, a second non-heating member is made of a second metallic material, and the heating member and the forward end of the second non-heating member are connected to form a thermocouple;

said first metallic material is an electrothermic iron-chromium alloy, and said second metallic material is nickel or a nickel-chromium alloy;

said heating member comprising a small gauge wire wound in the form of a coil around a cylindrical insulating pipe is connected to said non-heating member of said first metallic material comprising a large gauge linear wire secured to the outer periphery of said insulating pipe;

said second non-heating member is a generally linear member passed into the bore of said insulating pipe and retained with a free air space around it;

a first ceramic coating is provided around said insulating pipe to cover said heating member, the coating material being coarse grade powder to absorb a difference in thermal expansion coefficient between said insulating pipe and said heating member;

a second ceramic coating is provided on said first ceramic coating, the coating material being fine grade powder to achieve strict insulation.

* * * * *

UNITED STATES PATENT AND TRADEMARK OFFICE
CERTIFICATE OF CORRECTION

PATENT NO. : 6,054,678
DATED : April 25, 2000
INVENTOR(S) : Mitsuhiko Miyazaki

It is certified that error appears in the above-identified patent and that said Letters Patent is hereby corrected as shown below:

Title page, item [30],

Foreign Priority: Japanese Patent Application No. 09-82238

Signed and Sealed this

First Day of May, 2001

Attest:

NICHOLAS P. GODICI

Attesting Officer        Acting Director of the United States Patent and Trademark Office